Oct. 26, 1971 R. J. CHARLTON 3,615,070

CENTERING AND HOLDING APPARATUS

Filed April 16, 1969

INVENTOR
RICHARD J. CHARLTON

BY John H. Holcombe

ATTORNEY

United States Patent Office 3,615,070
Patented Oct. 26, 1971

3,615,070
CENTERING AND HOLDING APPARATUS
Richard J. Charlton, Los Gatos, Calif., assignor to International Business Machines Corporation, Armonk, N.Y.
Filed Apr. 16, 1969, Ser. No. 816,746
Int. Cl. F16m 13/00
U.S. Cl. 248—415 8 Claims

ABSTRACT OF THE DISCLOSURE

Apparatus for radially centering and axially aligning an object, such as a magnetic disk pack, with respect to a spindle of a disk file and holding the disk pack in place. The spindle is topped by a cylindrical surface beveled at the outer edge. The centering apparatus comprises a ring slotted to provide three spring-loaded tabs arranged to be of interference fit with the cylindrical surface. The beveled edge serves as a cam to spread the tabs of the ring radially and the tabs engage the cylindrical surface to hold and center the disk pack. A set of three buttons is provided with the centering apparatus to rest on a surface of the spindle to axially align the pack.

BACKGROUND OF THE INVENTION

Field of the invention

The invention relates to a centering and holding apparatus and more particularly to such apparatus for radially centering an object with respect to an axis.

Description of the prior art

A field in which precision radial centering apparatus is becoming extremely important is the field of data processing, and more particularly, disk file data storage units thereof.

In recent years, the usage of magnetic disk files for data storage has expanded rapidly due to the interchangeability of a plurality of disk packs with a single file, or a single disk pack with a plurality of files. In practice, a disk pack is employed on a given file for only a relatively short period of time, less than an hour, and then moved into a storage area or to another magnetic disk file.

Data is stored by recording physical magnetic domains in the magnetic surfaces of the individual disks comprising a disk pack. This data is magnetically written on and read from the disk pack by magnetic heads which are attached to and positioned by the file. The data is arranged in the form of a plurality of closely spaced, concentric circular tracks on each disk. Each track is read or written by positioning a magnetic head precisely in juxtaposition with the track while the disk pack is rotated about a central axis. This precise positioning is derived from accurate dimensional relationship between all of the following: the disk, the pack hub upon which the disk is mounted, the spindle upon which the hub is mounted, the bearings and mounting of the spindle for rotation within the file and the arm for mounting the magnetic head within the frame of the file.

As such file systems have developed, many improvements thereto have been directed to increasing the areal density of data. To attain such high densities, the concentric circular tracks are made closer and closer together and made narrower in width, so that a greater number of tracks may be fitted onto a single disk.

Therefore, consistency and precision in maintaining accurate radial alignment of a disk pack with the spindle of the file from pack to pack and from file to file is becoming increasingly important to allow such close spacing of the tracks.

Another factor important to increased future usage of disk packs as a storage medium for data is continued reduction in the cost of the disk packs. A radial centering device for a disk pack must therefore be relatively low in cost per disk pack.

The present radial centering apparatus for disk packs upon spindles comprises mating inner and outer conical surfaces. The surfaces must be of identical size in order to provide both precision radial centering and precision axial alignment. The taper of the conical surfaces is .5000±.0001 inch per inch over a height of greater than 1 inch. Obviously, should the basic diameter of one of the conical surfaces be slightly off, the axial alignment of the disk pack would be thrown off by a considerably greater amount. As is well known to those skilled in the art, the machining of conical surfaces to the precise accuracy required is a very expensive process.

SUMMARY

An object of the present invention therefore, is to provide a less costly consistent precision radial centering device for disk packs.

Briefly, the invention comprises apparatus for centering and holding an object with respect to an axis, the axis being defined by an engaging surface comprising a right cylindrical surface terminating in a beveled edge. The apparatus comprises a supporting member and at least three resilient engaging means supported by the supporting member approximately equally spaced about and at a diameter slightly less than the diameter of the engaging surface, each of the engaging means being arranged to slideably engage the surface. Thereby, the resilient means exerts substantially radial force against the surface so as to hold and radially center the supporting member and the object with respect to the engaging surface. Additionally, the object may be removed or engaged by axially sliding the supporting member and resilient means out of or into operative engagement with the engaging surface, the beveled edge thereof acting as a cam to engage the resilient means. The alignment of the object along the axis is established by three buttons attached to the supporting member of the object which rest on a surface connected to the right cylindrical surface, each forming a plane perpendicular to the respective axis.

DESCRIPTION OF THE PREFERRED EMBODIMENT

Figure 1:
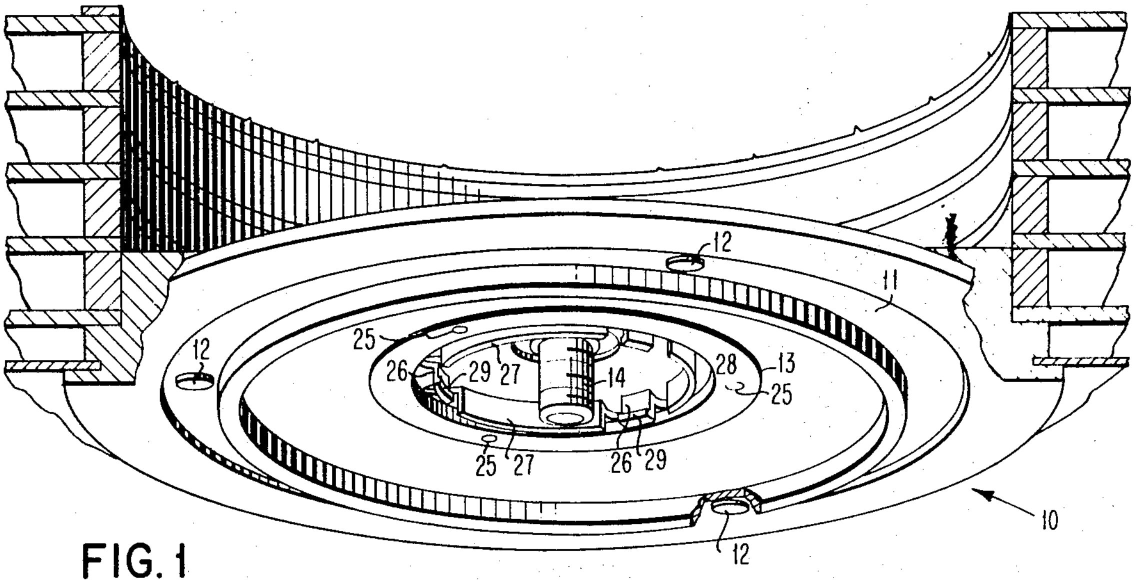
FIG. 1 is a perspective view of the bottom of a disk pack including the centering means of the present invention.

Referring to FIG. 1, a base 10 for a magnetic disk pack is illustrated. The base of the disk pack comprises a machined plate to which the magnetic disks and supporting structure (shown in phantom) are affixed, thereby forming a complete disk pack. The plate 10 includes a channel 11 machined therein having three radiused buttons 12 spaced equally distant from one another at the bottom of the channel. The channel 11 protects the buttons from impact. The buttons define a surface and rest upon a corresponding continuous surface of the spindle to establish the precise alignment of the disk pack along the axis of the spindle. The plate also includes a ring 13 which is near the center thereof and which defines the coaxial centers of the disks and hub of the disk pack. This ring establishes the radial centering of the disk pack with respect to the spindle of the disk file and is shown in greater detail in FIG. 3, as hereinafter described. An externally threaded sleeve 14 extends through the center of the ring 13. This sleeve comprises a portion of apparatus for locking the disk pack to the spindle and/or locking the disk pack to the container in which it is carried when moved from disk file to disk file. This apparatus is described in detail in U.S. Pat. 3,176,281, R. E. Pattison, "Portable Memory for Data Processing Machine," issued Mar. 3, 1965, and assigned in common with the present invention. The locking mechanism per se forms no part of the present invention, and therefore will not be further described.

Figure 2:
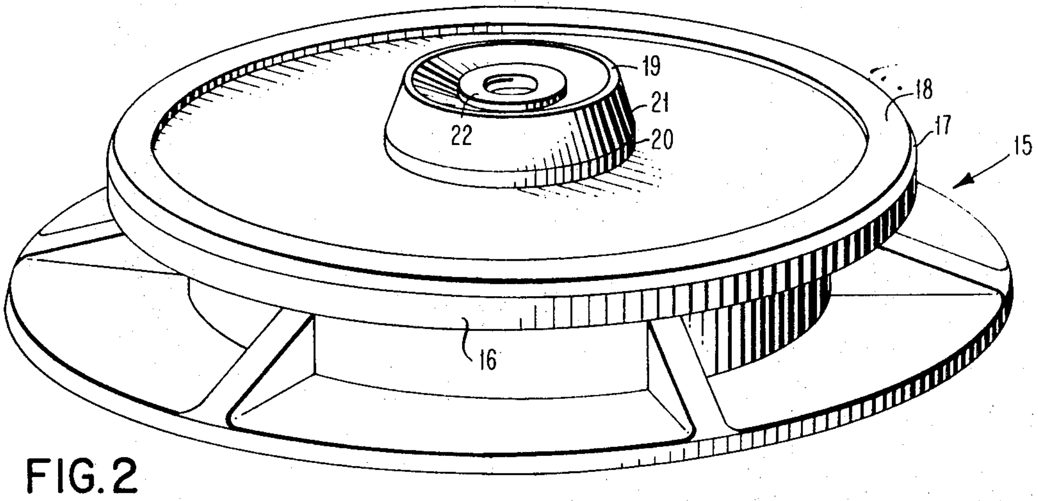
FIG. 2 is a perspective view, of the topmost portion of the spindle of a disk file having a surface to mate with the centering means of FIG. 1.

Referring to FIG. 2, a spindle 15 is illustrated having a plate 16 fixedly attached thereto. The plate 16 is precisely aligned with the central axis of rotation of the spindle 15. The plate 16 is machined to provide a circular ring 17 having a flat surface 18 thereon. This surface mates with the radius buttons 12 of the disk pack to establish the alignment of the disk pack along the axis of the spindle. The tripod formed by the buttons will provide proper axial position of the disk pack without tilt. The plate 16 is also machined to provide a second ring 19 at the center thereof. The ring 19 includes a right cylindrical surface 20 extending from the face of plate 16, the axis of which is coextensive with the axis of rotation of the spindle 15. The right cylindrical surface 20 of the ring 19 terminates with a beveled edge 21. By "beveled edge" is intended either a straight truncated conical surface as shown or a surface having a curvature along the axis. Located within and through the center of the ring 19 is a cylindrical spindle locking member 22. This member forms a part of the locking mechanism described in the Pattison patent, above.

Figure 3:
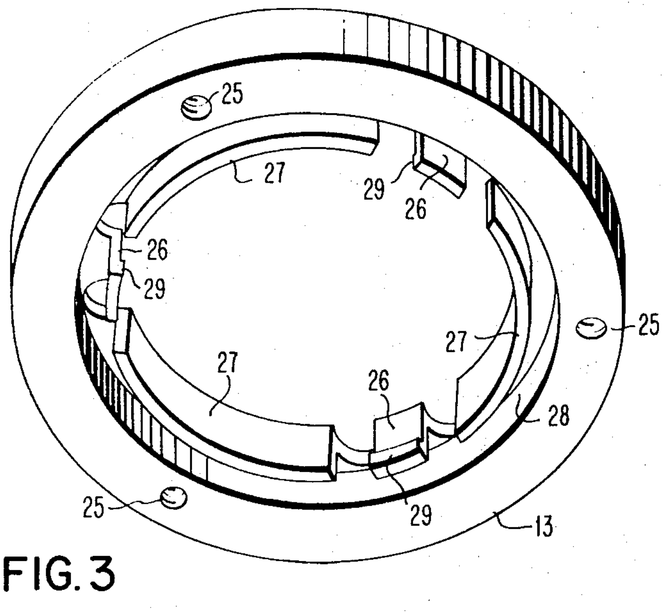
FIG. 3 is a perspective view, larger and in more detail, of the centering means of FIG. 1.

Referring to FIGS. 1 and 3, the ring 13 for centering and holding the disk pack on ring 19 of the spindle will be described in detail. The ring includes three threaded holes 25 spaced equidistant about the ring. These holes provide the means for attaching ring 13 to the base 10 of the disk pack through the use of cap screws placed through corresponding holes in the plate 10. The center of the ring is formed to divide the interior of the ring into a plurality of segments. The three smaller segments 26 are of equal size and are spaced equidistant about the ring 13. The segments are spaced from the central axis of the ring by an equal distance and this radius is slightly less than the radius of the right cylindrical surface 20 of ring 19 of the spindle, shown in FIG. 2. The three far larger segments 27 are likewise equally spaced about the ring and the face of each is at an equal radius from the central axis of ring 13 and this radius is slightly larger than the radius of the cylindrical surface 20 of ring 19, above. An annular slot 28 is cut into the ring 13 behind the faces of each of the segments 26 and 27. This slot is centered with respect to the axis of ring 13. The slot is cut to such a depth that the tabs 26 formed thereby may flex with respect to the remainder of the ring 13. The tabs 27 are of such greater length that they have a relative stiffness many times that of the tabs 26. The tabs 26 may be formed to have small faces 29 which are designed to contact the cylindrical surface 20. These faces assure that the only forces generated by the tabs at the point of contact will be perpendicular to the axis, as will be explained hereinafter.

The dimensional tolerances of each of the surfaces of tabs 26 and of the cylindrical surface 20 of ring 19 in FIG. 2 need not be as tight as the tolerances for the prior art centering devices. In addition, these mating surfaces are cylindrical surfaces which are much easier and less costly to produce than the precision tapered surfaces of the prior art. The relaxation of tolerances for the surfaces is made possible by the resilient nature of the tabs 26, effectually being spring loaded with respect to the remainder of ring 13. Thus, a slight dimensional inaccuracies merely alter to some extent the radial force generated by the tabs 26 upon the cylindrical surface 20, but do not alter the centering and alignment accuracy once it is established. Any uneven force merely establish the true "working" axis of the disk pack.

The larger tabs 27 are at a larger radius than that of cylindrical surface 20. They function merely as stops in the event the disk pack is jarred or twisted sideways by some outside force. In such instances, the stops 27 contact the cylindrical surface 20 and will not permit further movement of the pack. This limits the amount of flexing potentially encountered by each of the tabs 26 and thereby prevents their being overstressed and possibly broken.

Referring primarily to FIGS. 1 and 2, installation of the disk pack upon the spindle will be described.

Assuming that the spindle 15 is mounted in the disk file in the upright position, such that the axis of rotation thereof is vertical, the disk pack and the lower plate 10 thereof are lowered vertically into engagement with the spindle. First, the cylindrical sleeve 14 bears against and depresses the spindle locking members 22 against the action of a compression spring within the spindle. As the assembly is lowered, the faces 29 of tabs 26 engage the beveled edge 21 of ring 19. The beveled edge operates as a camming surface to spread the tabs 26 apart. These tabs spread by flexing with respect to ring 13. As the base plate 10 of the disk pack is finally lowered to the point where the buttons 12 contact the planar surface 18 of ring 17, the faces 29 of the tabs 26 are moved onto and engage cylindrical surface 20 of ring 19. The radial force of each of the tabs 26 thereby counteract one another to accurately center the ring 13, and hence the disk pack with respect to the axis formed by right cylindrical surface 20. The cylindrical sleeve 14 may be rotated so as to thread into the spindle locking member 22 and the disk pack locked in place as described by Pattison above.

Assume for the sake of argument that the spring constant of one of the tabs 26 may be slightly different from that of the others for the same centering ring 13. This might occur through a slight misalignment during slotting or during the cutting of annular slot 28. The amount of flexure of that tab required to compensate for the force generated by the flexure of the other two tabs when engaging cylindrical surface 20 causes the central axis of the disks and of the centering ring 13 to be slightly offset from the axis of rotation of spindle 15. Rotation of the disk pack by the spindle with respect to stationary heads adjacent the disks of the disk pack thereby results in a slight runout of the path traced by the heads with respect to the central axis of the disks. However, the same runout will appear when the disk pack is placed on every other disk file having a similar ring 19. Hence the path traced by the magnetic heads of one disk file will be identical to the path traced by the heads on other files. Thus, the radial centering apparatus described consistently and precisely centers the concentric circular recorded tracks of a disk pack with the axis of rotation of the spindle of each disk file upon which it is placed having the right cylindrical surface 20.

The buttons 12 and ring surface 18, which provides the vertical, or axial, alignment of the disk pack are located at a diameter much larger than that of the cylindrical surface 20. The points defining the vertical alignment planes are thereby placed at long distances from the center axis. Thus, any tendency for the pack to tilt or be skewed with respect to the axis is significantly reduced. The combination of the radial centering ring 13 with the axial alignment means 12 and 18 thereby assures both the axis of the working center of the disk pack is both centered with respect to and precisely aligned with the axis of rotation of the spindle 15. Applicant's centering and holding apparatus therefore assures that these two axes are in fact essentially coextensive, allowing full interchangeability of disk packs with respect to disk drives.

While the invention has been particularly shown and described with reference to a preferred embodiment thereof, it will be understood by those skilled in the art that various changes in form and details may be made therein without departing from the spirit and scope of the invention.

I claim:

1. Apparatus for radially centering and holding an object with respect to an axis defined by an engaging surface which comprises a right cylindrical surface terminating in a bevelled edge, said apparatus comprising:

a supporting member affixed to said object; and at least three resilient engaging means supported by and unitary with said supporting member so as to be disposed approximately equally spaced about and at a normal, when unstressed, diameter slightly less than the diameter of said right cylindrical surface, said engaging means being arranged to slidably engage said right cylindrical surface upon axial movement therebetween bringing said engaging means radially inward into operative engagement with said engaging surface, said bevelled edge thereof acting to cam said engaging means against the force of said resiliency into engagement with said engaging surface and said engaging means being arranged, when so engaged, to exert substantially radial force inwardly against said engaging surface so as to radially center and hold said supporting member in said object with respect to said axis.

2. Apparatus for radially centering and holding an object with respect to an axis defined by an engaging surface which comprises a right cylindrical surface terminating in a bevelled edge and an axial alignment surface spaced from said right cylindrical surface, said apparatus comprising:

a supporting member affixed to said object;

at least three resilient engaging means supported by said supporting member, each of said engaging means including resilient tabs radially equidistant from and parallel to a central axis, said radius being slightly less than the radius of said right cylindrical surface, said engaging means being disposed approximately equally spaced about and at a normal, when unstressed, diameter slightly less than the diameter of said right cylindrical surface, said engaging means being arranged to slidably engage said right cylindrical surface upon axial movement therebetween bringing said tabs into intimate contact with said engaging surface, said bevelled edge thereof acting to cam said tabs against the force of said resiliency into engagement with said right cylindrical surface and said tabs being arranged, when so engaged, to exert substantially radial force against said right cylindrical surface so as to radially center and hold said supporting member and said object with respect to said axis; and alignment means affixed to said object and comprising three radiused buttons, said alignment means arranged to lie in immediate contact with said axial alignment surface of said engaging surface when said engaging means are in engagement with said right cylindrical surface, the vertexes of said buttons defining a plane perpendicular to the central axis defined by said engaging means, thereby aligning said object both longitudinally along and angularly with respect to said axis defined by said engaging surface.

3. Apparatus for radially centering and holding an object with respect to an axis defined by an engaging surface which comprises a right cylindrical surface terminating in a bevelled edge and a circular axial alignment surface perpendicular to and spaced radially outward from said right cylindrical surface, said apparatus comprising:

a supporting member affixed to said object;

at least three resilient engaging means, supported by said supporting member so as to be disposed approximately equally spaced about and at a normal, when unstressed, diameter slightly less than the diameter of said right cylindrical surface, each of said engaging means including a resilient tab and each of said tabs having a face on the side thereof toward the central axis of said supporting member, said faces being radially equidistant from and parallel to said central axis, said radius being slightly less than the radius of said right cylindrical surface, said engaging means being arranged to slidably engage said right cylindrical surface upon axial movement therebetween bringing said engaging means into operative engagement with said engaging surface, said bevelled edge thereof acting to cam said faces of said tabs against the force of said resiliency into intimate contact with said right circular cylindrical surface, thereby causing said tabs to exert substantially radial force upon said right cylindrical surface so as to radially center and hold said supporting member and said object with respect to said axis; and alignment means affixed to said object and arranged to lie in immediate contact with said axial alignment surface of said engaging surface when said engaging means are in engagement with said right cylindrical surface, thereby aligning said object longitudinally with respect to said axis, said alignment means comprising three radiused buttons, the vertexes of which define a plane perpendicular to said central axis defined by said engaging means, thereby causing alignment of said object both longitudinally along and angularly with respect to said axis defined by said engaging surface.

4. Apparatus for radially centering and holding an object with respect to an axis defined by an engaging surface which comprises a right cylindrical surface terminating in a bevelled edge, said apparatus comprising:

a supporting member affixed to said object;

at least three resilient engaging means supported by said supporting member, each of said engaging means including resilient tabs radially equidistant from and parallel to a central axis, said radius being slightly less than the radius of said right cylindrical surface, said engaging means being disposed approximately equally spaced about and at a normal, when unstressed, diameter slightly less than the diameter of said right cylindrical surface, said engaging means being arranged to slidably engage said right cylindrical surface upon axial movement therebetween bringing said tabs into intimate contact with said engaging surface, said bevelled edge thereof acting to cam said tabs against the force of said resiliency into engagement with said right cylindrical surface and said tabs being arranged, when so engaged, to exert substantially radial force against said right cylindrical surface so as to radially center and hold said supporting member and said object with respect to said axis;

said fixed tabs of said supporting member being disposed between said resilient tabs, each at a radius from said central axis which is slightly greater than the radius of said right circular surface, thereby preventing overstressing of said resiliently supported tabs radially outward from said central axis.

5. The centering and holding apparatus of claim 4, wherein said engaging surface additionally includes an axial alignment surface spaced from said right cylindrical surface, said centering and holding apparatus additionally including:

alignment means affixed to said object and arranged to lie in immediate contact with said axial alignment surface of said engaging surface when said engaging means are in engagement with said right cylindrical surface, said alignment means being arranged to define a plane perpendicular to the central axis defined by said engaging means, thereby aligning said object both longitudinally along and angularly with respect to said axis defined by said engaging surface.

6. In a magnetic disk pack container, the combination for centering and holding the container with respect to an axis of a spindle defined by a right cylindrical surface terminating in a bevelled edge, said combination comprising:

an annular supporting member carried by and affixed to the underside of said disk pack container; and a plurality of at least three flexible tabs circumferentially and equally spaced around the inner periphery of and unitarily constructed with said supporting member;

said tabs in an unstressed condition having an inner surface that defines a diameter slightly less than that of the cylindrical surface of the spindle so that when the disk pack container is positioned on the spindle, the inner surface of said tabs is engaged and cammed by the bevelled edge thereof, against the force of resiliency and into engagement with said right cylindrical surface, whereby the tabs exert a force substantially radially inwardly against the spindle, thereby to radially center said disk pack container with respect to the spindle axis.

7. The combination set forth in claim 6, wherein said supporting member further comprises a plurality of fixed tabs disposed circumferentially between adjacent resilient tabs and having a radius from said spindle axis which is slightly greater than the radius of said right cylindrical surface, thereby to limit outward radial movement of said flexible tabs and to prevent overstressing thereof.

8. The combination set forth in claim 6, and further comprising axial alignment means protruding downwardly from the underside of said disk pack and disposed radially outwardly of said supporting member with the lowermost surface thereof defining a plane perpendicular to the axis of said spindle, said lowermost surface contacting a corresponding spindle base surface perpendicular to its central axis, thereby to establish vertical alignment of the disk pack on the spindle.

References Cited

UNITED STATES PATENTS

| | | | |
|---|---|---|---|
| 2,341,744 | 2/1944 | Sheffer | 279—41 |
| 2,378,720 | 6/1945 | Nelson | 279—41 |
| 2,479,796 | 8/1949 | Warzynski | 279—41 |
| 3,132,551 | 5/1964 | Westerlind | 279—41 |
| 3,176,281 | 3/1965 | Pattisun | 340—174.1 |
| 3,385,607 | 5/1968 | Hughes | 279—46 |

MARION PARSONS, Jr., Primary Examiner

U.C. Cl. X.R.

279—41